United States Patent
Updegrove

(10) Patent No.: US 6,944,816 B2
(45) Date of Patent: Sep. 13, 2005

(54) AUTOMATED SYSTEM FOR PERFORMING KEPNER TREGOE ANALYSIS FOR SPREAD SHEET OUTPUT

(75) Inventor: Darryl Updegrove, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 627 days.

(21) Appl. No.: 09/947,093

(22) Filed: Sep. 5, 2001

(65) Prior Publication Data

US 2003/0046284 A1 Mar. 6, 2003

(51) Int. Cl.[7] ............................................. G06F 17/24
(52) U.S. Cl. ...................... 715/503; 715/971; 706/60
(58) Field of Search ........................ 715/503, 504; 707/10; 706/13, 60; 345/971

(56) References Cited

U.S. PATENT DOCUMENTS

| | | | | |
|---|---|---|---|---|
| 5,182,793 A | * | 1/1993 | Alexander et al. ............. | 706/13 |
| 5,926,817 A | * | 7/1999 | Christeson et al. ............ | 707/10 |
| 6,195,643 B1 | * | 2/2001 | Maxwell ........................ | 705/10 |
| 6,631,362 B1 | * | 10/2003 | Ullman et al. ................. | 706/60 |
| 2003/0052787 A1 | * | 3/2003 | Zerhusen et al. ......... | 340/573.1 |
| 2003/0208429 A1 | * | 11/2003 | Bennett ........................ | 705/36 |

* cited by examiner

Primary Examiner—Heather R. Herndon
Assistant Examiner—Doug Hutton
(74) Attorney, Agent, or Firm—James T. Shepherd

(57) ABSTRACT

An automated system for performing a Kepner Tregoe analysis provides a graphical user interface having dedicated data entry screens that include i) a first screen for entering criteria to be used in the Kepner Tregoe analysis, ii) a second screen for entering a relative importance value between each of the criteria and all others of the criteria, iii) a third screen for entering candidates to be used in the Kepner Tregoe analysis, and iv) a fourth screen for entering a raw score associated with each of the criteria for each of the candidates. A separate and dedicated score processor calculates the various parameters associated with the Kepner Tregoe analysis. A text file generator arranges the data for use by a spread sheet processor that will then function solely as part of an output device.

6 Claims, 3 Drawing Sheets

*FIG. 3*

| CRITERIA | WEIGHTS | OPTION 1 | OPTION 2 | OPTION 3 | OPTION 4 |
|---|---|---|---|---|---|
| CRIT A | 1 | 5 | 4 | 3 | 2 |
| CRIT B | 5.5 | 5.5 | 11 | 16.5 | 22 |
| CRIT C | 10 | 50 | 40 | 30 | 20 |
| CRIT D | 3.25 | 3.25 | 6.5 | 9.75 | 13 |
| CRIT E | 3.25 | 16.25 | 13 | 9.75 | 6.5 |
| CRIT F | 10 | 10 | 20 | 30 | 40 |
| KT TOTAL | | 15 | 15.75 | 17.25 | 17.25 |

US 6,944,816 B2

AUTOMATED SYSTEM FOR PERFORMING KEPNER TREGOE ANALYSIS FOR SPREAD SHEET OUTPUT

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to the automation of numerical analysis problems, and more particularly to a system for automating the performance of a Kepner Tregoe analysis that is to be output in a spread sheet format so that criteria and/or candidates used in the analysis can be updated without changing spread sheet formulations.

BACKGROUND OF THE INVENTION

The Kepner Tregoe analysis is a well known non-biased numerical analysis tool used to provide a relative ranking of various candidates that are under consideration. To determine a relative rank, the analysis utilizes a plurality of features or criteria associated with each candidate. The criteria are evaluated in terms of their relative importance to one another to yield a relative criteria value. The relative criteria values are then used in conjunction with candidate scores to develop total scores for each candidate. A detail description of the Kepner Tregoe analysis can be found in "The Rational Manager" by C. H. Kepner and B. B. Tregoe, McGraw-Hill Book company, New York, 1965.

In order to provide a user with meaningful results of a Kepner Tregoe analysis, a spread sheet format is typically used to clearly set forth the candidates being evaluated, the criteria being used in the evaluation, and the scores generated by the Kepner Tregoe analysis. A variety of computerized spreadsheet processors such as LOTUS 1-2-3 and MICROSOFT EXCEL are well known in the art. These computerized spread sheets can have the Kepner Tregoe analysis formulas associated with each grid position in the spread sheet. However, if candidates and/or criteria are to be added or deleted, the spread sheet must be re-worked. This process is inefficient and time consuming.

SUMMARY OF THE INVENTION

Accordingly, it is an object of the present invention to provide a system for performing a Kepner Tregoe analysis.

Another object of the present invention is to provide a system for accommodating candidate and/or criteria changes in a Kepner Tregoe analysis.

Still another object of the present invention is to provide a system for automating a Kepner Tregoe analysis that is to be output in a spread sheet format.

Other objects and advantages of the present invention will become more obvious hereinafter in the specification and drawings.

In accordance with the present invention, a system for performing a Kepner Tregoe analysis provides a graphical user interface having a home screen and a plurality of data entry screens independently accessible through the home screen. The data entry screens include i) a first screen for allowing a user to specify criteria to be used in the Kepner Tregoe analysis, ii) a second screen for allowing a user to assign a relative importance value between each of the criteria and all others of the criteria, iii) a third screen for allowing a user to specify candidates to be used in the Kepner Tregoe analysis, and iv) a fourth screen for allowing a user to specify a raw score associated with each of the criteria for each of the candidates. A score processor coupled to the graphical user interface calculates i) a relative weight value for each of the criteria using each relative importance value associated therewith, ii) a Kepner Tregoe weighted score for each of the criteria associated with each candidate, and iii) a Kepner Tregoe total score for each candidate. A text file generator arranges a combination of the candidates, criteria, relative weight values, Kepner Tregoe weighted scores and Kepner Tregoe total scores in a format suitable for use by a spread sheet processor.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is an in the embodiment of a spread sheet format that can be used in the present invention.

DETAILED DESCRIPTION OF THE INVENTION

Figure 1:
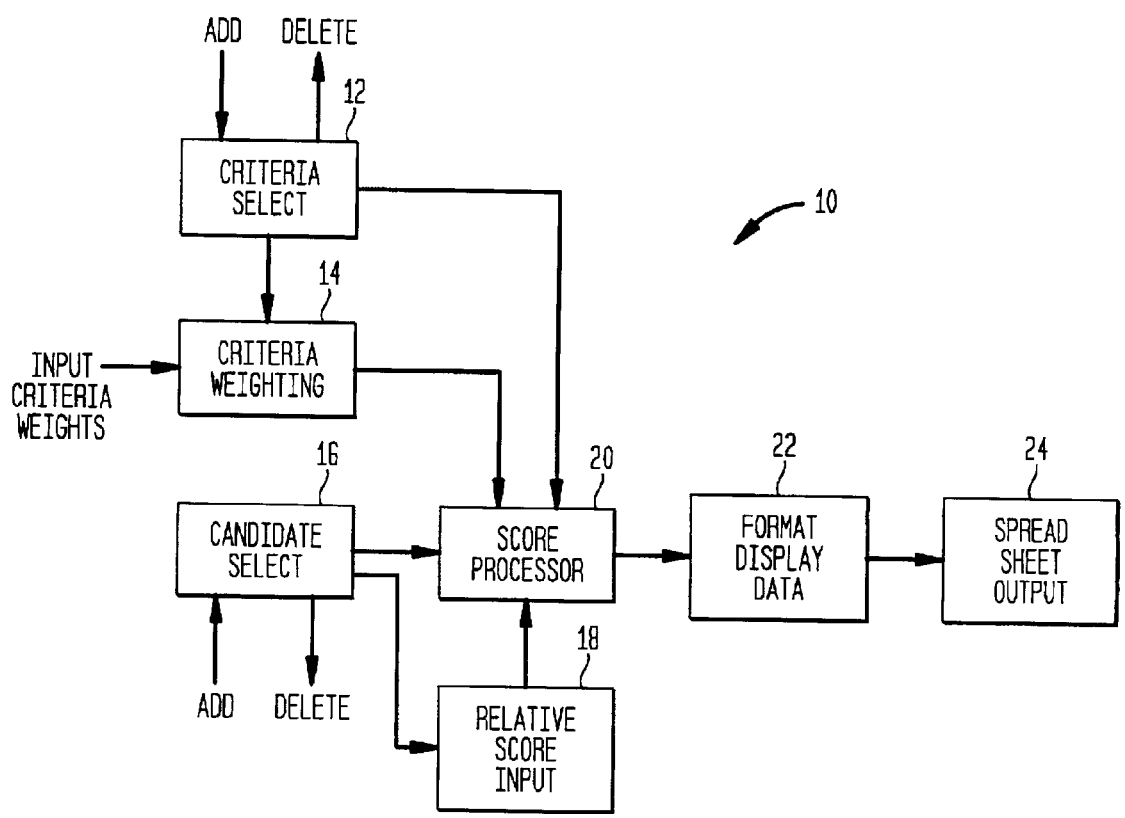
FIG. 1 is a functional block diagram of an automated system for performing a Kepner Tregoe analysis for a spread sheet output in accordance with the present invention.

Referring now to the drawings, and more particularly to FIG. 1, a system for performing a Kepner Tregoe analysis in accordance with the present invention is shown in block diagram form and is referenced generally by numeral 10. By way of example, system 10 will be described herein for performing a Kepner Tregoe analysis on a number of candidate automobiles using a number purchasing criteria. Such an analysis might be performed by an institution preparing to purchase a new fleet of automobiles. However, it is to be understood that the present invention is not limited to particular types or number of candidates and/or criteria.

Before describing system 10, it will be helpful to briefly describe the Kepner Tregoe analysis which performs a primarily non-biased numerical analysis of the relative ranking of various candidates that are under consideration for comparison. The first step taken is to determine what criteria will be used for analysis. The criteria are the features that are considered important in determining the relative worth of the candidates under consideration. In the illustrative example, the criteria might include cost, color, weight, fuel mileage, taste, etc. Once the criteria have been chosen, they are each compared to the other criteria on a one-against-one basis to determine which is more important, or if they are equally important. Thus, the only three possible solutions in the one-against-one comparison are as follows: i) item A is more important, ii) item B is more important, or iii) they are equally important. A value of 1 is assigned if a criteria is found more important than another. A value of -1 is assigned if it is found less important. A value of 0 is assigned if they are equally important. Once all the criteria have been measured against each other, the sum of scores for each criteria is determined. The highest value possible is (N-1) where N is the total number of criteria. This would be the result if a criteria were determined to be more important than all other criteria. The lowest value possible is −(N−1). This would be the result if a criteria were determined to be less important than all other criteria. Once all the criteria scores have been summed, a calculation is performed to scale these scores from 1 to 10 thereby generating a relative weight value (RWV) for each criteria in accordance with the following RWV=[(criteria summed score−lowest summed score)×9/(highest summed score−lowest summed score)]+1

Next, each chosen candidate is given a raw score based on each criteria. For example, car A is graded on its gas mileage, car A is graded on its cost, car B is graded on its gas mileage, car B is graded on its cost. Each raw score is multiplied by the criteria's relative weight value from the previous step. These scores are then added to get what will be referred to herein as a Kepner Tregoe total score for each candidate. For example, a Kepner Tregoe total score for candidate A ($KT_A$) can be written as $KT_A$=($RWV_{criteria1}$*raw score for candidate A referenced to criteria 1)+ ($RWV_{criteria2}$*raw score for candidate A referenced to criteria 2)+ . . . +($RWV_{criteriaN}$*raw score for candidate A referenced to criteria N) This calculation is performed for each candidate and the resulting Kepner Tregoe total scores are compared to each other. Whichever candidate has the highest Kepner Tregoe total score is the one that is to be chosen.

System 10 automates the above-described process while providing the ability to provide a computerized spread sheet output that readily adapts to additions/deletions of candidates/criteria. In this way, a user can add/delete candidates and/or criteria and immediately reproduce a spread sheet output incorporating the changes. Since all Kepner Tregoe analysis processing takes place outside of the computerized spread sheet, the user need not concern himself with updating any of the grid positions of the spread sheet. That is, all updates to the spread sheet occur automatically via system 10.

System 10 includes a criteria select block 12 that allows a user to specify (i.e., add or delete) criteria that are to be used in the Kepner Tregoe analysis. A criteria weighting block 14 is coupled to criteria select block 12 and is configured to receive a user's assignment of a value indicative of relative importance between each of the criteria selected. The relative importance values associated with each criteria are used to generate the relative weight value (RWV) for each criteria as described above.

A candidate select block 16 allows a user to specify (i.e., add or delete) candidates that are to be considered by the Kepner Tregoe analysis. The selected candidates are made available to a relative score input block 18 that allows a user to assign a raw or unweighted score for each selected criteria for each selected candidate. The raw score is essentially a "grade" that is user-assigned to each criteria for a given candidate.

A score processor 20 is coupled to each of blocks 12, 14, 16 and 18. Score processor 20 can perform the calculation of each criteria's relative weight value. Each criteria's relative weight value is then multiplied by the criteria's raw score for that candidate with the resulting weighted scores being summed to yield a Kepner Tregoe total score for that candidate.

The resulting Kepner Tregoe weighted and total scores, as well as the candidates and criteria, are made available to a format display data block 22 that formats the supplied data into a spread sheet format as will be explained further below by way of an illustrative example. Block 22 supplies its formatted data to a spread sheet output block 24 which, typically, is a screen or print display device.

Figure 2:
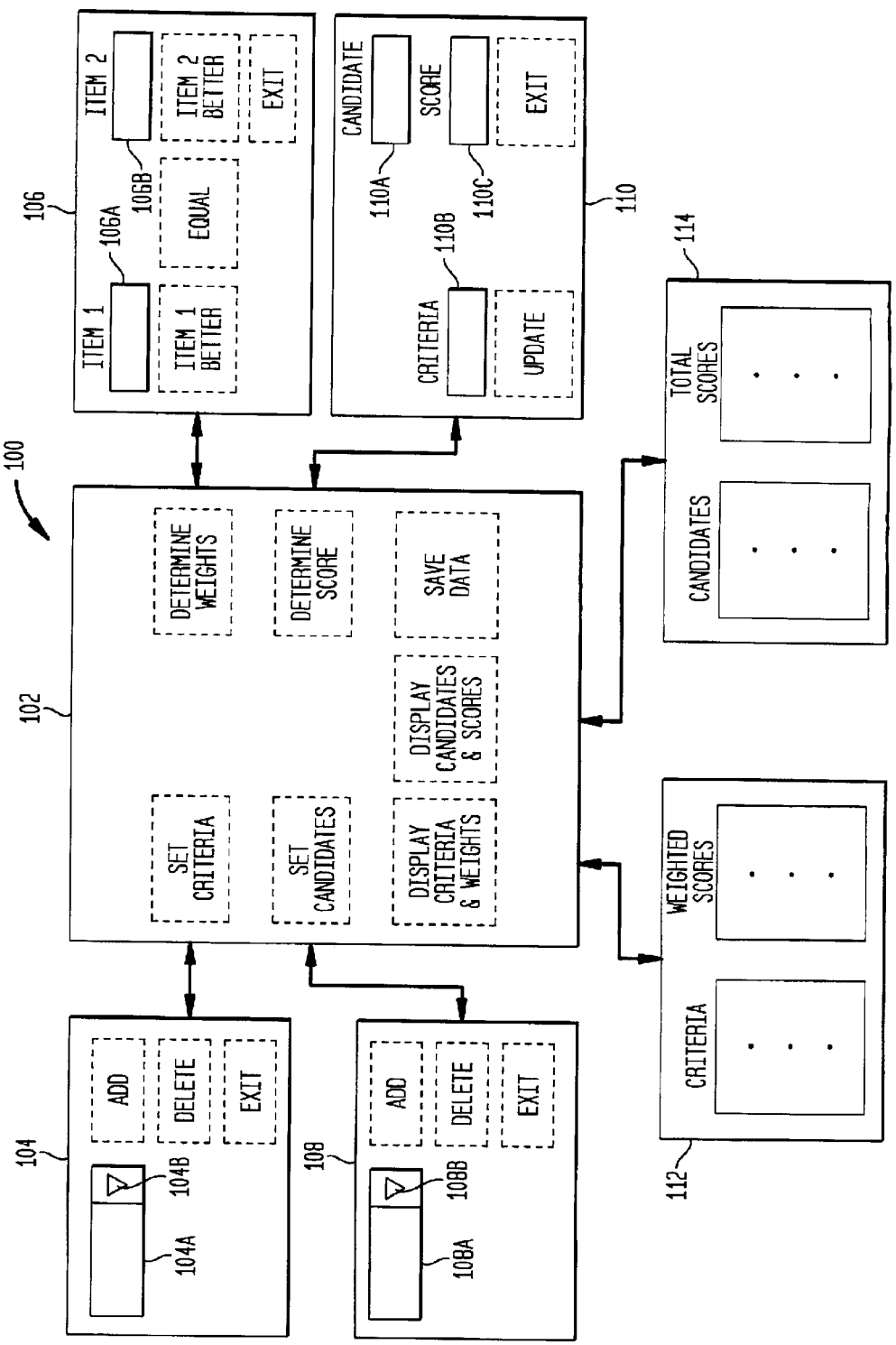
FIG. 2 is a diagrammatic view of the Windows-based graphical user interface used in the present invention.

System 10 can be implemented by means of a graphical user interface, one embodiment of which will now be described with the aid of FIG. 2 where reference numeral 100 generally designates the interface. By way of illustrative example, graphical user interface 100 is a MICROSOFT WINDOWS-based graphical user interface that includes a main screen 102 that allows a user to independently access a number of other screens to assist in data entry. The data entry screens include a screen 104 accessed via a "SELECT CRITERIA" button. Screen 104 allows a user to add or delete Kepner Tregoe analysis criteria via a data entry window 104A which can include a "pull down" listing of possible criteria accessed by selecting pull down arrow 104B. Use of such "pull down" arrows is well known in the art and will not be described further herein. Buttons for "ADD", "DELETE" and "EXIT" can be provided where the "EXIT" button will return the user to main screen 102.

A screen 106, accessed via a "DETERMINE WEIGHTS" button, allows a user to assign relative importance values to each criteria relative to every other criteria specified via screen 104. More specifically, one criteria appears in window 106A and another appears in window 106B. A user then selects one of the buttons "ITEM 1 BETTER", "EQUAL" or "ITEM 2 BETTER" so that the displayed criteria are assigned relative importance values of −1, 0 or 1 as described above. Once all one-against-one criteria relationships have had relative importance values assigned thereto, screen 106 is exited and the user is once again returned to main screen 102.

A screen 108 can be selected via the "SET CANDIDATES" button on main screen 102. Screen 108 allows a user to add or delete the candidates that are to be used in the Kepner Tregoe analysis. A data entry window 108A is used to input candidate names. A pull down 108B can also be provided/used to select candidates from a provided list. Once again, buttons for "ADD", "DELETE" and "EXIT" can be provided where the selection of "EXIT" returns the user to main screen 102.

A screen 110, accessed via a "DETERMINE SCORE" button, allows a user to assign the raw score associated with all criteria for each candidate. Accordingly, each candidate is accessed via data entry window 110A while each criteria is accessed via data entry window 110B. For each candidate/criteria combination, the user inputs a raw score via data entry window 110C. An "UPDATE" button is used to apply the supplied information and an "EXIT" button returns the user to main screen 102.

Once all data for a given Kepner Tregoe analysis has been entered using graphical user interface 100, the data is provided to a processor (e.g., score processor 20) for generation of each criteria's relative weight value and the Kepner Tregoe weighted and total scores as described above. For a quick display of these items relative to their respective criteria and candidates, graphical user interface 100 can provide additional user-accessed screens. For example, a screen 112 can be accessed via a "DISPLAY CRITERIA AND WEIGHTS" button to allow a user to view all criteria used and their respective relative weight values determined as a result of the user's inputs to screen 106. A screen 114 can be accessed via a "DISPLAY CANDIDATES AND SCORES" button to allow a user to view each candidate and their respective Kepner Tregoe total score.

Graphical user interface 100 also includes a "SAVE DATA" button that initiates the formatting of both user-supplied and calculated data into a spread sheet format. for example, if MICROSOFT EXCEL is the spread sheet processor of choice, format display block 22 (FIG. 1) is a text file generator that creates the necessary ASCII file for interpretation by the EXCEL spread sheet processor. More specifically, block 22 generates a text file that includes the candidate names, the criteria, the calculated relative weight values, the Kepner Tregoe weighted scores and the Kepner Tregoe total scores. The file is created such that the variables are separated/delimited from one another in a manner interpretable by the spread sheet processor. To illustrate this function, a sample text file is reproduced below where commas are used as field delimiters.

SAMPLE TEXT FILE criteria, weights, option 1, option 2, option 3, option 4,
crit A, 1, 5, 4, 3, 2,
crit B, 5.5, 5.5, 11, 16.5, 22,
crit C, 10, 50, 40, 30, 20,
crit D, 3.25, 3.25, 6.5, 9.75, 13,
crit E, 3.25, 16.25, 13, 9.75, 6.5,
crit F, 10, 10, 20, 30, 40,
KT Total, , 15, 15.75, 16.5, 17.25, The spread sheet display resulting from this sample text file is illustrated in FIG. 3 where the names of the criteria appear as row headings positioned in the leftmost column of the display. The next column lists the relative weight values determined for each criteria. The subsequent columns have headings identified by the various candidates being considered with their respective Kepner Tregoe weighted scores being aligned in that column in the row corresponding to the particular criteria.

The advantages of the present invention are numerous. The Kepner Tregoe analysis has been automated and made more efficient by the present invention. The user can specify/update his criteria, their relative importance, the candidates and their raw scores outside of a computerized spread sheet so that the spread sheet can be utilized only as a data output device as opposed to a calculation device. Thus, the present invention can readily adapt to various applications/updates while still utilizing the advantages of a spread sheet output format.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for performing a Kepner Tregoe analysis, comprising:

a data input device defined by a graphical user interface having a home screen and a plurality of data entry screens independently accessible through said home screen and dedicated to data entry functions, said plurality of data entry screens including i) a first screen for allowing a user to specify criteria to be used in said Kepner Tregoe analysis, ii) a second screen for allowing a user to assign a relative importance value between each of said criteria and all others of said criteria, iii) a third screen for allowing a user to specify candidates to be used in said Kepner Tregoe analysis, and iv) a fourth screen for allowing a user to specify a raw score associated with each of said criteria for each of said candidates;

a score processor coupled to said graphical user interface dedicated to the calculation of i) a relative weight value for each of said criteria using each said relative importance value associated therewith, ii) a Kepner Tregoe weighted score for each of said criteria associated with each of said candidates using said relative weight value and said raw score associated therewith, and iii) a Kepner Tregoe total score for each of said candidates using each said Kepner Tregoe weighted score associated with each of said candidates; and a text file generator coupled to said score processor and dedicated to the arrangement of a combination of said candidates, said criteria, each said relative weight value, each said Kepner Tregoe weighted score and each said Kepner Tregoe total score in a text file having a format suitable for use by a spread sheet processor that functions solely as part of an output device dedicated to the display of said candidates, said criteria, each said relative weight value, each said Kepner Tregoe weighted score and each said Kepner Tregoe total score in a spread sheet format.

2. A system as in claim 1 wherein said graphical user interface is a Windows-based graphical user interface.

3. A system as in claim 1 wherein said text file generator creates said text file such that each of said plurality of candidates will be interpreted as a column heading by said spread sheet processor.

4. A system as in claim 1 wherein said text file generator creates said text file such that each of said plurality of criteria will be interpreted as a row heading by said spread sheet processor.

5. A system as in claim 4 wherein said text file generator creates said text file such that each said relative weight value will be interpreted by said spread sheet processor as a row position immediately adjacent its corresponding one of said plurality of criteria.

6. A system as in claim 5 wherein said text file generator creates said text file such that said plurality of criteria will be interpreted by said spread sheet processor as a leftmost column of a display generated by said spread sheet processor, and wherein said plurality of candidates will be interpreted by said spread sheet processor as column headings to the right of said leftmost column.

* * * * *